Oct. 18, 1949.  M. W. BRAINARD  2,485,474
PERMANENT MAGNET ROTOR
Filed Jan. 11, 1947  3 Sheets-Sheet 2
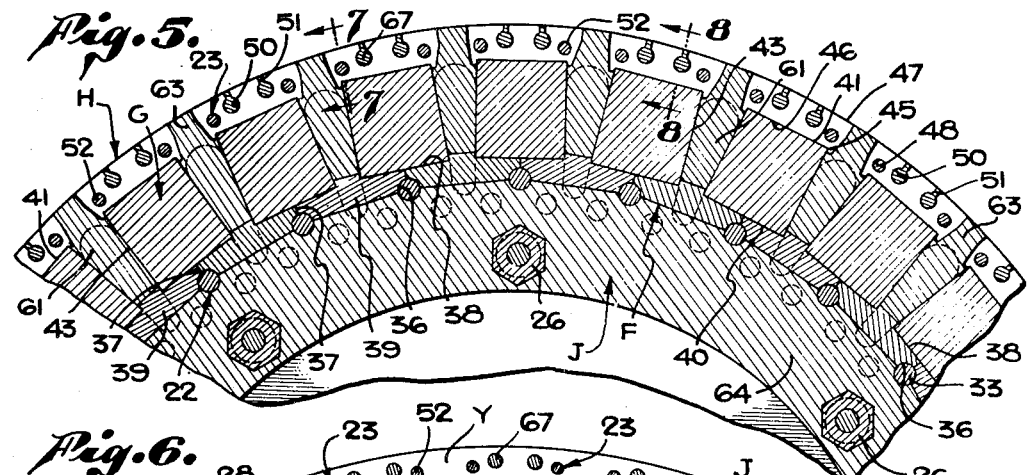
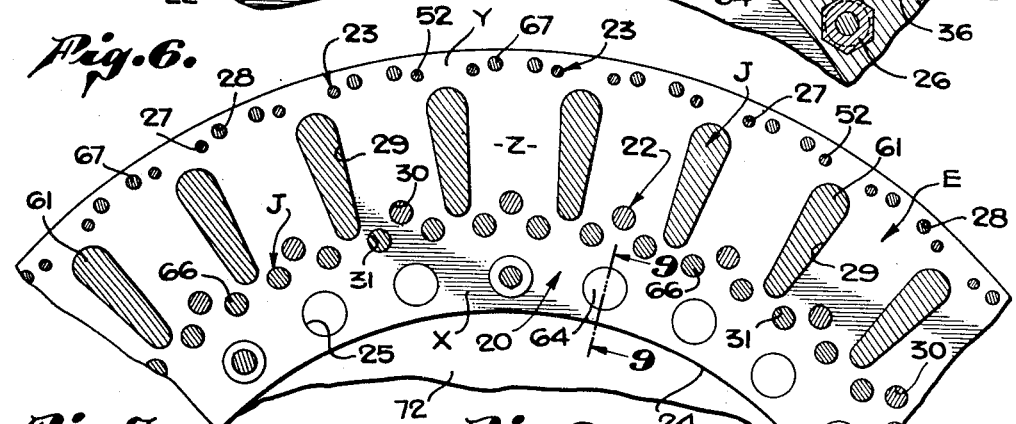
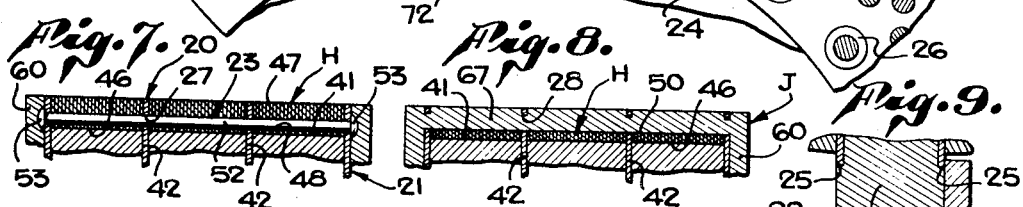
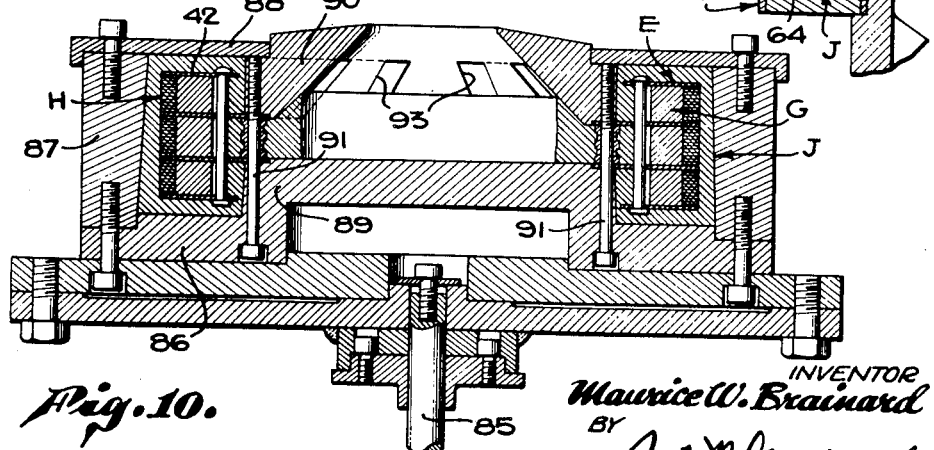
INVENTOR
Maurice W. Brainard
BY
ATTORNEY Oct. 18, 1949.     M. W. BRAINARD     2,485,474
PERMANENT MAGNET ROTOR
Filed Jan. 11, 1947     3 Sheets-Sheet 3
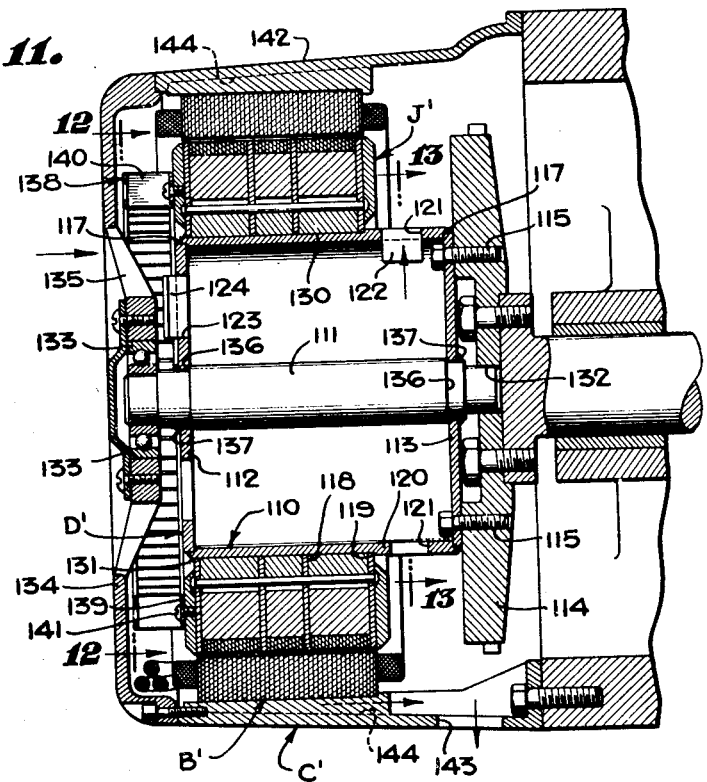
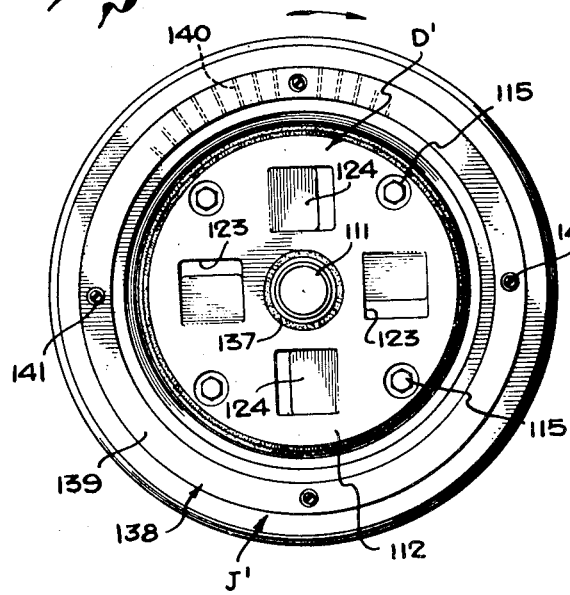
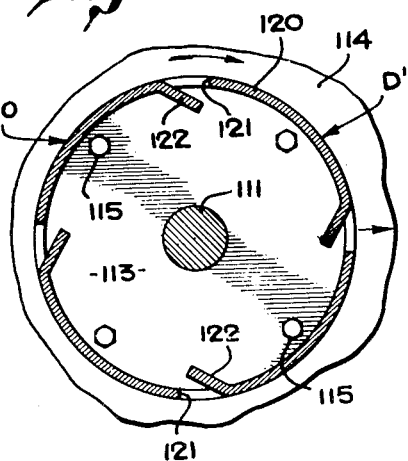
INVENTOR
Maurice W. Brainard
BY
ATTORNEY Patented Oct. 18, 1949

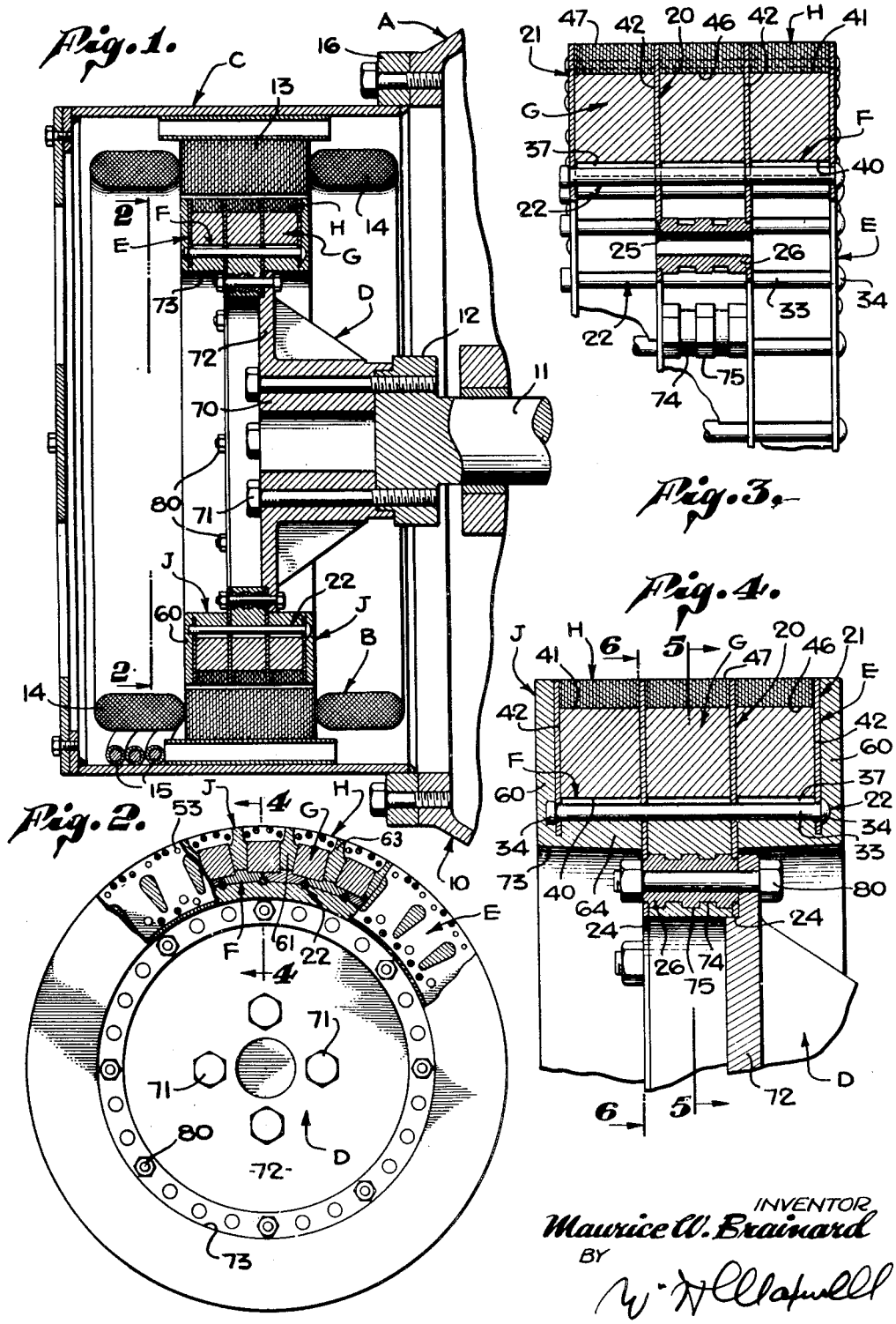

2,485,474

UNITED STATES PATENT OFFICE 2,485,474

PERMANENT MAGNET ROTOR

Maurice W. Brainard, Los Angeles, Calif., assignor of one-half to O'Keefe and Merritt Company, Los Angeles, Calif., a corporation of California Application January 11, 1947, Serial No. 721,527

12 Claims. (Cl. 171—209)

This invention relates to a permanent magnet rotor, it being a general object of the invention to provide a simple, practical, improved rotor by which a magnetic field is established through a plurality of permanent magnets.

Rotors of electric machines such as motors and generators may be operated at high speeds and when so operated they are subject to centrifugal and other forces that must be resisted if they are to stay in operating condition. It is exceedingly difficult to obtain proper strength and rigidity in a rotor employing permanent magnets to establish all or part of the required magnetic field. This is due in part to the fact that the best magnetic material is extremely brittle and cannot be relied upon to withstand appreciable tensile strain and when any substantial portion of the magnetic field is established by permanent magnets the magnets constitute a large proportion of the total mass of the rotor.

It is an object of the present invention to provide a rotor construction embodying a plurality of permanent magnets each with a pole piece, which magnets and pole pieces are effectively carried by a fabricated frame.

A further object of the present invention is to provide a rotor frame for carrying a plurality of magnets and parts incidental thereto which frame involves few inexpensive parts and is such that it can be easily and inexpensively manufactured.

It is another object of the present invention to provide a rotor of the general character referred to wherein the magnets are arranged in a series axially of the rotor, individual magnets of each series being spaced by parts of the frame and the series being arranged in an annular assembly around the axis of the rotor.

A further object of the present invention is to provide a rotor of the general character referred to wherein the magnets are seated on magnetic couplers which in turn are located by ties that join the plates of the rotor frame. The arrangement that I have provided is such that there is a magnetic coupler joining the inner ends of adjacent magnets throughout the entire rotor so that magnetic flux is effectively communicated between the inner ends of the magnets.

A further object of the present invention is to provide a rotor of the general character referred to involving individual laminated pole pieces on the outer ends of the magnets which pole pieces are effectively tied or secured in the rotor by fasteners of the frame and are also provided with damper bars electrically coupled to the body of the rotor which embraces the various other parts being preferably cast thereon.

Another object of the invention is to provide a simple, practical and inexpensive mounting or supporting means for a rotor of the character hereinabove referred to.

The various objects and features of my invention will be fully understood from the following detailed description of typical forms and applications of the invention, throughout which description reference is made to the accompanying drawings, in which:

Fig. 1 is a longitudinal or axial section of a typical electric machine embodying a rotor including the present invention. Fig. 2 is an end view of the rotor being a view taken as indicated by line 2—2 on Fig. 1, showing certain parts broken away to reveal the internal construction of the rotor. Fig. 3 is an enlarged sectional view of the frame of the rotor taken at the peripheral portion thereof and showing the parts before the body has been applied thereto. Fig. 4 is a view similar to Fig. 3 showing the body applied and showing the structure joined to a suitable mounting flange being a view taken as indicated by line 4—4 on Fig. 2. Fig. 5 is an enlarged detailed sectional view taken as indicated by line 5—5 on Fig. 4. Fig. 6 is an enlarged sectional view taken as indicated by line 6—6 on Fig. 4. Fig. 7 is a sectional view taken as indicated by line 7—7 on Fig. 5. Fig. 8 is a sectional view taken as indicated by line 8—8 on Fig. 5. Fig. 9 is a sectional view taken as indicated by line 9—9 on Fig. 6. Fig. 10 is a view illustrating the rotor in the course of manufacture, being a view showing the parts in a mold such as may be employed in applying the body to the other parts. Fig. 11 is a view similar to Fig. 1 showing another form of the invention. Fig. 12 is a view taken as indicated by line 12—12 on Fig. 11, and Fig. 13 is a view taken as indicated by line 13—13 on Fig. 11.

The rotor of the present invention may be used, generally, in electric machines, although it is particularly applicable to electric generators wherein permanent magnets are employed to establish the desired field. In the drawings I have shown the rotor of the present invention in a generator and I have shown the generator related to a prime mover to be driven thereby. In Fig. 1 of the drawings I have shown a portion of a suitable engine A involving a case 10 and a drive shaft 11 projecting from the case and provided on its end with a drive flange 12. The generator is shown as including a stator B located in a suitable case C and a rotor arranged within the stator and joined to the engine shaft 11 by a suitable mounting or coupling means D. The stator B shown in the drawings involves laminated cores 13 wound with suitable coils 14 connected to the load through suitable lead lines 15. The case C of the generator is shown secured directly to the case 10 of the engine A by a suitable flange connection 16.

The rotor provided by my present invention involves, generally, an annular frame E, magnetic couplers F carried by the frame, a plurality of magnets G carried by the frame and seated on the couplers, pole pieces H at the outer ends of the magnets, and a body J embracing or applied to the various other parts of the rotor.

The annular frame E is formed of non-magnetic material, say for instance, a suitable stainless steel, and it involves, generally, a plurality of axially spaced plates. The plates may be alike. However, when I have axial series of magnets I provide inner plates 20 and end plates 21, a plurality of axial ties 22 joining the several plates at the inner marginal portions thereof, and a plurality of axial fasteners 23 joining the several plates at the outer marginal portions thereof.

The inner plates 20 may vary widely in number, form and arrangement. However, I prefer to employ at least two inner plates spaced apart axially to accommodate magnets G between them and I prefer that all of the inner plates be alike and that they be simple flat plates provided with the characteristics I will hereinafter describe. By providing two inner plates 20 and two end plates 21 I provide a frame that will advantageously accommodate axial disposed groups of magnets G each of which group involves three magnets, one magnet being arranged between the two inner plates while the others are arranged between the inner plates and the end plates as clearly illustrated in Figs. 3 and 4 of the drawings. Where the several magnets of each axial group correspond in size the several plates of the frame will be equally spaced apart as shown in Figs. 1 to 10 of the drawings.

Each inner plate 20 is preferably formed of a single sheet or body of sheet metal which is round or disc-shaped and which has a large central opening 24 making the plate annular in form. The inner marginal portion X of each central plate 20 projects radially inward from the other parts of the rotor and forms a part connected to the coupler D. The outer marginal portion Y of each inner plate carries or forms a mounting for the pole pieces H applied to the magnets G. The intermediate or middle portion Z of each inner plate carries the axial ties 22 and overlies the sides of magnets G confining them axially.

Each inner plate is characterized by a plurality of suitably shaped and located openings as will be understood from an examination of Fig. 6 of the drawings. The inner marginal portion X of the plate is provided with annular series of openings 25 which may be round openings uniformly spaced around the plate and which serve to accommodate mounting blocks 26 employed in connecting the rotor with the coupler D. In carrying out my invention I may provide more openings 25 than are needed to accommodate the number of blocks 26 employed in the construction in which case portions of the body fill or occupy the unused openings 25, as shown in Fig. 9 of the drawings.

The outer marginal portion Y of each inner plate is provided with suitably shaped and located openings 27 which accommodate the axial fasteners 23 and it is also provided with suitably shaped and located openings 28 which receive or pass parts of the body J which form the damper bars at the pole pieces H. I prefer to make the damper bars part of or integral with the body rather than form them as separate parts. The middle or intermediate portion Z of each plate 20 is provided with circumferentially spaced radially disposed web openings 29 located to occur opposite or in axial alignment with the spaces that occur between adjacent magnets or adjacent series of magnets. Near the inner ends of the web openings 29 the plate 20 has tie openings 30 which pass or accommodate the axial ties 22 and somewhat inward of the openings 30 the plate has an annular series of circumferentially spaced openings 31 that accommodate parts of the body J.

Each end plate 21 may be the same as each of the inner plates 20 except that it is without the inner marginal portion X provided with the openings 25.

The axial ties 22 join or couple the several plates of the frame and in the preferred form of the invention each tie involves an elongate rod-like part 33 that passes through the openings 30 in the several plates and heads 34 are provided on the ends of the rod 33 outside of the end plates so that the ties serve to retain the frame parts more or less tightly assembled on the magnets and other parts arranged in connection with them, as will be hereinafter described. In accordance with the preferred form of the invention there is an axial tie 22 located at a point spaced somewhat radially inward from the inner end of each magnet or inward of the inner ends of the several magnets of each axial group of magnets.

The magnetic couplers F extend between and are located by the rod portions 33 of the axial ties 22 and they are located between adjacent plates of the frame so that they serve to space the plates at the region of the axial ties. Each magnetic coupler F bridges the gap between adjacent axial ties and has recesses 36 at its inner end corners receiving a portion of a tie rod as clearly illustrated in Fig. 5 of the drawings. The magnetic couplers are proportioned to bridge or extend between adjacent axial ties so that they are held by the ties against inward radial movement and when located on the ties their ends 37 abut. The outer side of each magnetic coupler at each end thereof is dressed or finished to form a seat portion 38 and the two seat portions that occur at adjacent ends of adjoining couplers form a single seat supporting a magnet G, the body portion 39 of each coupler being such as to extend continuously and uninterruptedly from one magnet to the next to form an effective magnetic couple between adjacent magnets.

The magnets G are preferably alike or identical as to form and size except for axial length of any one group and in the preferred form of the invention they are block-like structures having inner ends 40 that seat on the seat portions 38 of the couplers F, outer ends 41 which carry the pole pieces H, side walls 42 which oppose and bear against the side of the plates of the frame, and side walls 43 which face circumferentially of the rotor and which are parallel. The parts are arranged and proportioned so that when the magnets G are seated on the seat portions 38 of the couplers F they project radially and are spaced a substantial distance apart circumferentially.

I preferably provide a pole piece H of suitable magnetic material for each magnet G so that the pole pieces for the several magnets of each axial group of magnets are spaced apart by the inner plates of the frame and are confined between end plates of the frame. Each pole piece preferably extends circumferentially at the outer end of the magnet on which it is located so that its ends project somewhat beyond the magnet where it has inwardly projecting lugs 45 that overlie the magnet preventing circumferential displacement of the magnet relative to the pole piece. The inner side or face 46 of each pole piece is flat and fits on the outer end 41 of the supporting magnet and the outer face 47 of each pole piece is preferably convex and curved substantially concentric with the axis of the rotor.

In the preferred form of the invention each pole piece is a laminated structure formed of a plurality of like plates arranged together in side by side relation as shown throughout the drawings. Each pole piece has axially disposed openings 48 registering with the openings 27 to pass or receive the axial fasteners 23 and it also has one or more axial openings 50 registering with openings 28 in the plates of the frame to accommodate portions of the body which form the damper bars. Channels 51 are preferably formed from the openings 50 to the outer periphery 47 of the pole piece so that parts of the damper bars extend to the periphery of the rotor.

The axial fasteners 23 may resemble the axial ties 22 and when they are so formed each fastener involves a rod portion 52 extending through the registering openings 27 and 48 of the plates and pole pieces respectively. Heads 53 are provided on the outer ends of the rods 52 and serve to retain the plates and pole pieces tightly assembled. By providing a plurality of axial fasteners in connection with each pole piece the pole pieces are effectively tied into the frame and are held in the proper position at the outer ends of the magnets.

The body J is preferably a cast body of nonmagnetic material and is applied to the other parts of the rotor to embrace them and to fill the various voids and interstices that occur in the structure above described. In general the body is formed so that it has rings 60 that occur at the outer side of each end plate of the frame, webs 61 that extend through the openings 29 in the plates of the frame and between adjacent magnets, spacers 63 that project radially from the webs to extend between the ends of adjacent pole pieces, and an inner or hub portion 64 of substantial mass that occupies the spaces between the plates of the frame and inward of the magnetic couplers held in the frame. The core 64 is coupled with the rings 60 and the parts of the core separated by the inner plates 20 are coupled by coupling or connecting parts 66 of the body which occupy the holes or openings 31 provided in the plates of the frame. The body further includes parts or bar-like portions 67 which occupy the openings 50 and channels 51 to form damper bars at the pole pieces. The bar portions 67 likewise extend through the openings 28 in the plates of the frame and join the rings 60 so the body forms a complete electrical circuit surrounding each pole.

The coupling means D may in practice be any suitable structure serving to mount the rotor above described on the shaft 11 of the prime mover. In the case illustrated the coupling means involves a hub 70 attached to the flange 12 of the shaft 11 by suitable fastening devices 71. A flange 72 projects radially from the hub 70 to extend outwardly to a point close to the inner side 73 of the body core 64 and close to the outer side of one of the inner plates 20. The blocks 26 that occur at suitable intervals around the rotor are carried in openings 25 in the inner plates 20 and serve to space the inner plates apart. The exterior of each block 26 is grooved at 74 and made polygonal at 75 so that when the blocks are embedded or incorporated in the core portion of the body they are effectively anchored therein. Bolts 80 extend through the flange 72 and the blocks 26 and serve to effectively bolt or couple the rotor to the peripheral portion of the flange.

In the manufacture of the rotor I prefer to assemble the various parts except for the body J into a tight or snug assembly as free as possible of play or looseness, especially on the outer periphery, it being possible in practice to readily gain a tight assembly by properly heading over the rods of the axial ties and axial fasteners hereinabove described. The assembly is then preferably heated, say to about 1000° F. whereupon the body J is cast on or to it, it being preferred to centrifugally cast the body to the other parts of the rotor. In Fig. 10 I show the rotor in a rotary mold with the body cast to the other parts. When centrifugally casting the body to the other parts I may in practice assemble the parts so that the inner ties are slightly loose allowing centrifugal force to move the magnets and couplers outward into firm engagement with the pole pieces.

The mold involves a vertically disposed rotating shaft 85 and the mold proper involves a bottom 86, a side wall 87, a top wall 88 and core sections 89 and 90 projecting inwardly from the bottom 86 and top 88, respectively. The parts of the rotor other than the body may be suitably coupled or secured in the mold by fastening devices 91 and as the mold is rotated at a suitable speed molten metal to form the body J is introduced into the mold to pass outwardly through radial feed openings 93 in one of the cores. The body is initially cast to have the various parts above described and may have an excess of material so that it can be trimmed or dressed to the desired size and shape after the finished structure has been removed from the mold. It is to be understood that by casting the body onto the heated assembly the whole structure cools and becomes consolidated into a tight unit in which there is no play or freedom between the various parts entering into the whole.

From the foregoing description it will be apparent that I have provided a rotor involving a plurality of magnets G which magnets are effectively joined magnetically by the magnetic couplers F, and are provided at their outer ends with the pole pieces H and yet they are in no way relied upon to communicate forces such as may develop or occur in the course of operation of the rotor. The major portion of the forces or stresses that develop during operation are taken by the frame E of the rotor and particularly by the several plates incorporated in the frame. The plates of the frame are particularly effective in resisting centrifugal force or stress in that they are disposed in planes normal to the axis of rotation and are of substantial extent radially where they carry the other parts of the rotor. Further, it will be apparent that the axial ties and axial fasteners are so located and related to the other parts of the rotor as to positively and effectively maintain the parts against separation or shifting axially and in the finished rotor the several magnets G are effectively clamped between the plates of the frame.

The coupling or mounting means D' shown in Figs. 11 to 13, inclusive, differs somewhat from the means D hereinabove described in that it involves, generally, a drumlike element driven by the prime mover and having the rotor assembly fixed permanently thereon rather than the flange 72 and connections hereinabove described.

The drum includes a shell shaped element 110 mounted on a central shaft 111 through end plates 112 and 113. The end plate 113 is located at the inner end of the shell 110 and may serve as the element through which driving connection is made with the prime mover. In the case illustrated the end 113 is shown abutting the flywheel 114 of the engine to which element it is fixed as by screw fasteners 115.

The shell 110 may be a simple, cylindrical part having the ends 112 and 113 fixed thereto as by welding 117. A seat 118 is turned or otherwise formed on the exterior of the shell 110 preferably from one end, which seat terminates at a shoulder 119 and forms the part on which the rotor assembly is mounted. The shell 110 has an end portion 120 projecting a substantial distance axially from the rotor assembly and I may provide ventilation openings or ports 121 in the projecting shell part 120 operable to pass air or other suitable cooling medium. It is preferred, when the ports 121 are employed to provide inwardly projecting blades 122 on the interior of the shell portion 120 at the ports 121, which blades are shaped, pitched and located so that as the rotor rotates they circulate air from within the shell outwardly through the ports 121. The air employed for cooling may be admitted into the shell in any suitable manner. In the case illustrated I show air inlet ports 123 in the outer end 112 and I show blades 124 projecting from the end 112 at the ports 123 which blades serve to direct air inwardly through the ports. The air is discharged through ports 143 in the casing 142.

The end wall 134 of the case may be provided with air inlet openings 135, as clearly illustrated in Fig. 11 of the drawings. For ventilating the structure hereinabove described I also provide a suitable blower 138 consisting of inner and outer rings 139 spaced by series of blades 140. The inner ring 139 may be secured to the rotor by screws 141. The stator B' is supported by the case 142 so that it surrounds the rotor, and the stator supporting portion of the case has axial air passages 144. Air drawn in through openings 135 by the blower passes outwardly along the wall 134 and then axially through passages 144 to discharge through openings 143 in casing 142.

The rotor assembly employed on the shell may be the same as that hereinabove described except that it is preferably formed so that it seats solidly on the seat 118 of the shell 110, and for this purpose the rotor assembly is provided with a central bore 130 formed in the structure comprising the body J' and the frame parts embedded in the body and particularly the plates of the frame. I prefer to form the seat 118 and the bore 130 so that the rotor assembly is attached to the shell by heating the rotor assembly and then applying it to the shell to shrink thereon. I may also provide additional fastening means such as welding 131 or the like, if desired.

When the means D' is provided with a central shaft such as I have shown in the drawings, I prefer to centralize the inner end of the shaft as by introducing it into a central bore 132 in the flywheel 114 or other engine part accessible to the shaft 111, and I prefer to provide a suitable bearing such as an anti-friction bearing 133 to support the outer end of the shaft 111. In the case illustrated the bearing 133 carrying the outer end of shaft 111 is carried by the outer end wall 134 of the generator case C'. The shaft 111 may be of any desired length and it is preferably formed to effectively support the shell 110 through the ends 112 and 113. In the case illustrated the end portions of the shaft 111 have outwardly facing shoulders 136 against which the ends 112 and 113 abut, and the ends are secured or made fast to the shaft by suitable means such as welding 137.

Having described only typical forms and applications of my invention, I do not wish to be limited or restricted to the specific details herein set forth, but wish to reserve to myself any variations or modifications that may appear to those skilled in the art and fall within the scope of the following claims.

Having described my invention, I claim:

1. In combination an annular rotor unit including, a frame, a plurality of magnets carried by the frame, an annular series of separate contiguous magnetic couplers connecting the inner ends of adjacent magnets, and pole pieces carried by the frame at the outer ends of the magnets, the frame including a plurality of axially spaced plates having the magnets arranged between them and axial members connecting the plates and holding both the pole pieces and the magnetic couplers with the magnets confined between them, a shaft, and mounting means extending radially of the shaft and supporting the rotor unit.

2. A rotor including, a frame having axially spaced plates and axial ties extending between the plates, a plurality of like magnetic couplers between the plates and bridged between the ties, and spaced magnets in an annular series projecting radially from the ends of two adjacent couplers and confined between the plates.

3. A rotor including, a frame having axially spaced plates, axial fasteners between the plates and axial ties extending between the plates, a plurality of like magnetic couplers between the plates and bridged between the ties, magnets associated with said couplers with each magnet projecting radially from two adjacent couplers and confined between the plates, and pole pieces held by the fasteners between the plates at the outer ends of the magnets.

4. A rotor including, a frame having a plurality of plates having concentric annular series of registering openings, axial tie members in the inner series of openings and connecting the plates, and axial fasteners in the outer series of openings and connecting the plates, an annular series of like magnetic couplers between the plates and supported by the tie members, pole pieces between the plates and supported by the fasteners, and permanent magnets between the plates and confined between the couplers and pole pieces.

5. A rotor including, a frame having a plurality of plates having annular series of registering openings, axial tie members in one series of openings and connecting the plates, and axial fasteners in another series of openings and connecting the plates, an annular series of separate magnetic couplers between the plates and supported by the tie members, spaced pole pieces between the plates and supported by the fasteners, permanent magnets between the plates underlying and abutting the pole pieces and confined between adjacent portions of separate couplers and said pole pieces, and a molded body embracing the frame and the parts carried thereby and including parts extending through the pole pieces forming damper bars at the pole pieces.

6. A rotor including, a frame having a plurality of plates having annular series of registering openings, axial tie members in one series of openings and connecting the plates, and axial fasteners in another series of openings and connecting the plates, an annular series of separate magnetic couplers between the plates and supported by the tie members, spaced pole pieces between the plates and supported by the fasteners, permanent magnets between the plates underlying and abutting the pole pieces and confined between adjacent portions of separate couplers and said pole pieces, and an integral molded body including rings at the ends of the frame, a core portion between and through the plates and damper bars at the pole pieces.

7. A rotor including, a frame, a plurality of magnets carried by the frame, a plurality of like magnetic couplers each coupler underlying and connecting the inner ends of adjacent magnets, and pole pieces carried by the frame at the outer ends of the magnets, the frame including a plurality of axially spaced annular plates having the magnets arranged between them and axial members connecting the plates, the magnets and pole pieces being in series extending axially of the rotor and the series of magnets and pole pieces being spaced circumferentially around the axis of the rotor.

8. A rotor including a frame, a plurality of permanent magnets carried by the frame, an annular series of like magnetic couplers with each coupler underlying and connecting adjacent inner ends of two magnets, pole pieces carried by the frame abutting the outer ends of the magnets, and a molded body embracing the parts and providing damper parts at the pole piece.

9. In a rotor of the character described, a shaft, a rotor supported thereon, a frame including a plurality of annular axially spaced nonmagnetic plates, a plurality of spaced permanent magnets arranged between said plates, separate pole pieces at the outer ends of said magnets, an annular series of magnetic couplers each coupler connecting and underlying inner ends of adjacent magnets, and a plurality of circumferentially spaced axially extending members connecting the plates and supporting the series of magnetic couplers.

10. In a rotor of the character described, a frame including a plurality of annular axially spaced plates, circumferentially spaced pole pieces carried by the frame at the outer circumferential portion thereof, permanent magnets underlying the pole pieces in abutting relationship therewith, an annular series of magnetic couplers each coupler connecting and underlying adjacent inner end portions of adjacent magnets, and a plurality of axial members connecting the plates and holding the pole pieces and magnetic couplers with the magnets positioned and confined between them, and means for supporting and connecting said rotor assembly on a driving member.

11. A rotor as defined in claim 5 having a central bore and mounting means including a drum having a portion tight in the bore of the rotor.

12. In a rotor assembly of the character described, a frame including a plurality of annular axially spaced plates, circumferentially spaced axial fasteners connecting said plates, spaced pole pieces fixed and supported by said fasteners between said plates, permanent magnets having outer ends underlying the pole pieces in abutting relationship therewith, an annular series of like magnetic couplers each coupler underlying and connecting adjacent inner end portions of adjacent magnets, and a series of inner axial tie members connecting said plates, said magnetic couplers being bridged between said tie members free to move in tightening engagement of the couplers and magnets with the pole pieces under centrifugal force when the assembly is spun in a molding operation.

MAURICE W. BRAINARD.

REFERENCES CITED

The following references are of record in the file of this patent:

UNITED STATES PATENTS

| Number | Name | Date |
|---|---|---|
| 412,854 | Kingdon | Oct. 15, 1889 |
| 559,531 | Kelly | May 5, 1896 |
| 580,977 | Jeck | Apr. 20, 1897 |
| 633,857 | Lamme | Sept. 26, 1899 |
| 690,060 | Jacoby | Dec. 31, 1901 |
| 716,193 | Conklin | Dec. 16, 1902 |
| 896,323 | Reist | Aug. 18, 1908 |
| 919,511 | Wood | Apr. 27, 1909 |
| 928,037 | Frost | July 13, 1909 |
| 1,274,115 | Warren | July 30, 1918 |
| 1,393,395 | Pletscher | Oct. 11, 1921 |
| 1,543,347 | Turner | June 23, 1925 |
| 1,663,318 | Schou | Mar. 20, 1928 |
| 1,858,261 | Barnholdt | May 17, 1932 |
| 1,916,700 | Walther | July 4, 1933 |
| 1,958,903 | Shutt | May 15, 1934 |
| 1,996,946 | Beeh | Apr. 9, 1935 |
| 2,195,706 | Nowosielski | Apr. 2, 1940 |
| 2,293,508 | Killam | Aug. 18, 1942 |
| 2,300,520 | Pollard | Nov. 3, 1942 |
| 2,352,894 | Harmon | July 4, 1944 |
| 2,418,980 | Morrill | Apr. 15, 1947 |

FOREIGN PATENTS

| Number | Country | Date |
|---|---|---|
| 495,813 | Great Britain | Nov. 21, 1938 |
| 584,182 | France | Nov. 14, 1924 |